July 19, 1927.

R. MACK

ELECTRIC WELDING APPARATUS

Filed Feb. 17, 1921

1,636,676

Inventor:
Richard Mack
By: Herbert J. Ry
Attorney.

Patented July 19, 1927.

1,636,676

UNITED STATES PATENT OFFICE.

RICHARD MACK, OF BERLIN-TEMPELHOF, GERMANY.

ELECTRIC WELDING APPARATUS.

Application filed February 17, 1921, Serial No. 445,902, and in Germany November 11, 1920.

The present invention relates to electric welding and it is one of the principal objects to provide an automatic cessation of the welding operation. This is accomplished, in general terms, by utilizing the increase of the welding current to operate a switch which automatically interrupts the welding current when any desired stage of the welding operation has been reached.

Other objects and advantages of the invention will appear from the ensuing description.

Figure 1:
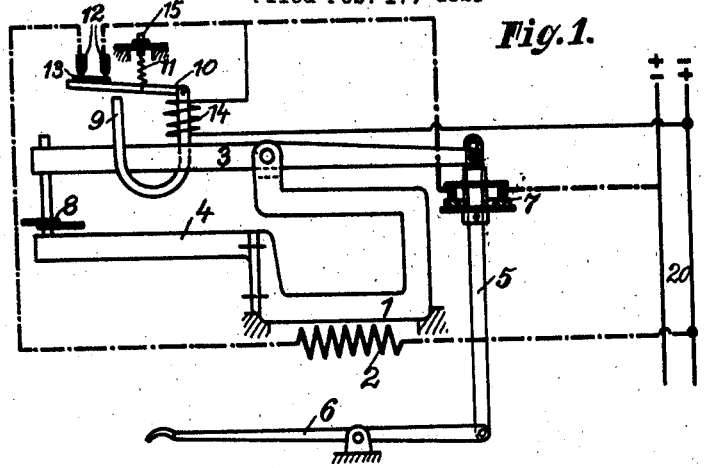

In the accompanying drawings, Fig. 1 shows a diagrammatic plan of the circuits and apparatus to which this invention is applied.

Figure 2:
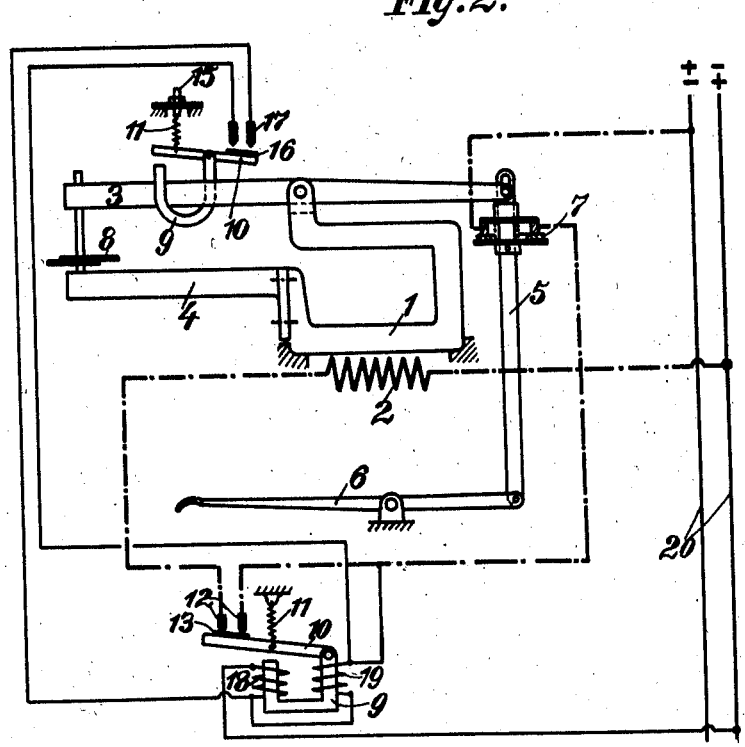

Fig. 2 is a modified form, also diagrammatic.

Referring to Fig. 1, the usual secondary winding 1 of the transformer of the apparatus co-operates with the primary winding 2 of the main circuit coming from the main current conductors 20. The secondary winding circuit includes the lower arm 4 and the upper conducting arm 3 which is pivoted at a central point as shown. A vertical rod 5 is connected at its lower end to a foot lever 6, and at its upper end to the oscillating arm 3. The rod 5 also carries the primary current switch 7 for making and breaking the primary circuit at this point under the operation of the foot lever 6.

The sheet metal work pieces to be welded are shown at 8. A magnet 9 has an armature 10 which is held by spring 11 in circuit-closing position shown in Fig. 1.

The switch-contacts 12 of the primary circuit are bridged across by the contact-piece 13 which is secured to the armature 10 by proper insulation.

A solenoid or locking coil 14 also surrounds part of the magnet 9 and forms part of a circuit tapped off of the primary line as shown. The tension of the spring 11 is adjusted by means of a set screw 15.

The operation of this apparatus shown in Fig. 1 is as follows:—The work pieces 8 which are to be welded, having been placed in position, the foot lever 6 is pressed down by the operator thereby carrying the rod 5 upward to close the primary circuit at 7 and at the same time exert mechanical pressure on the work pieces 8 during the operation of welding. The primary circuit thus having been closed, the secondary or welding circuit is now operative to carry on the process of welding the two pieces 8 together.

With the increase of the welded area, the resistance thereof decreases owing to the increased area, so that the secondary current thereby increases.

The ampere windings of the solenoid 14 and those of the secondary current conductor 3, which likewise operates through the magnet 9, thus have a combined effect to pull downward upon the armature 10. The spring 11 is adjusted by means of the set screw 15 to such an extent with reference to the pull of the magnet 9 upon the armature, that when the secondary current reaches a certain point dependent upon the desired area of welding, then at this point the pull on the armature is just enough to overcome the tension of the spring 11 and thereby break the circuit at the switch contacts 12.

It will be noted that although the circuit is thus broken to stop the welding operation at this desired point, yet the operator, still holding the foot lever 6 depressed, is thereby holding the work pieces 8 still under mechanical pressure. The advantage of this will be obvious.

In order to prevent the armature 10 from returning to its upper position after this interruption of the primary circuit, the armature is held in lower position by means of the action of the solenoid or voltage coil 14 until the main primary circuit is itself broken at another point, namely the switch contacts 7. This occurs when the pressure on the foot lever 6 is released so as to break the current at this point 7.

Thereupon the armature 10 again returns to its normal upper position closing the contact points 12 and thus leaving the apparatus ready for the next welding operation by the operation of the foot lever 6.

If a more or less intensive welding is desired, it is only necessary to tension or to slacken the spring 11 by means of the screw 15, which will, of course, govern the extent of welding area which takes place before the circuit is broken and the welding operation stopped.

In the modified form shown in Fig. 2, the primary current relay and the voltage relay are separated from each other as shown. The armature 10 in this case carries at its outer end the contact-closing device 16, suitably insulated, and adapted to close the circuit at the contact-point 17. The magnet 9 in this case carries the solenoid 18 of the voltage relay, and likewise carries the rheostat 19. In this case the primary current relay has a task by short-circuiting of the rheostat 19, by means of the contacts 17, to increase the drawing force of the solenoid 18, whereby the armature 10 is drawn downward and the primary circuit is interrupted. In this embodiment, also, the primary circuit remains interrupted until, by the release of the foot lever 6, the primary circuit is broken at the switch 7, which interrupts the circuit of the coils 18 and 19.

Various advantages will be apparent in this invention, several of which may be mentioned as follows:—It will be noted that it is the increase in the intensity of the secondary current, resulting from the progress of the welding operation, which is employed to operate the switching device which directly and automatically interrupts the primary circuit, or the welding operation, at just the desired point. This not only assists in preventing waste of current, but it makes possible a greater regularity in welding quality. Difficulties due to the presence of impurities in the metal, or dirt, or irregularities due to changing thickness or to dents, are thus overcome. Overheating of the work material is avoided. The welding parts may be held together under mechanical pressure as long as desired subsequent to the cessation of the welding operation. The size of the welding area may be controlled at will, and it is not necessary to take such great care that the welding current is not selected too high in order to avoid overheating at the welding points.

The advantage of this method of area control, as compared with positive time control, will likewise be obvious, particularly in cases where the material worked upon is of varying condition and character so that the times for welding could never be exactly alike.

While the forms of mechanism just described are well suited for carrying out my invention, it is to be understood that other forms might be adopted without departing from the spirit of the invention.

Having thus described my invention, what I claim is as follows:

1. In an electric resistance welding apparatus the combination with a primary circuit and a welding circuit, of pressure means for applying pressure to the work and closing the welding circuit in operation, said pressure means being also designed to close the primary circuit, of automatic means controlled by the resistance in the welding circuit for breaking the primary circuit irrespective of the pressure-operated means.

2. In an electric resistance welding apparatus, the combination with welding circuits comprising primary and secondary circuits, of a switch in said primary circuit, a magnet having an armature for operating said switch, said magnet being under the control of the secondary circuit, and a spring device for holding said primary switch closed but having provisions for adjusting the spring tension relatively to the secondary circuit pull on said armature whereby to operate said armature and open the primary switch at a predetermined point in the intensity of the secondary current.

3. In an electric resistance welding apparatus, the combination with welding circuits comprising primary and secondary circuits, of a switch in said primary circuit, a magnet having an armature for operating said switch, said magnet being under the control of the secondary circuit, and a spring device for holding said primary switch closed but having provisions for adjusting the spring tension relatively to the secondary circuit pull on said armature whereby to operate said armature and open the primary switch at a predetermined point in the intensity of the secondary current; with a locking coil for holding the armature in circuit-opening position until the primary circuit is broken at another point.

In testimony whereof I affix my signature.

/RICHARD MACK.